(12) United States Patent
Ma

(10) Patent No.: US 8,577,611 B2
(45) Date of Patent: Nov. 5, 2013

(54) SYSTEM AND METHOD FOR ANALYZING TREES IN LIDAR DATA USING VIEWS

(75) Inventor: Zhenkui Ma, Kent, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 540 days.

(21) Appl. No.: 12/827,878

(22) Filed: Jun. 30, 2010

(65) Prior Publication Data
US 2011/0246073 A1 Oct. 6, 2011

Related U.S. Application Data

(60) Provisional application No. 61/319,174, filed on Mar. 30, 2010.

(51) Int. Cl.
G06F 15/00 (2006.01)
G06F 15/18 (2006.01)
G01V 7/00 (2006.01)
G01V 3/00 (2006.01)

(52) U.S. Cl.
USPC .............................................. 702/2; 706/62

(58) Field of Classification Search
USPC ......................................................... 706/62
See application file for complete search history.

(56) References Cited

U.S. PATENT DOCUMENTS

| 6,525,319 B2 | 2/2003 | Meglen et al. |
| 7,474,964 B1 | 1/2009 | Welty |
| 2007/0291994 A1 | 12/2007 | Kelle et al. |
| 2008/0319668 A1 | 12/2008 | Welty et al. |
| 2011/0149267 A1 | 6/2011 | Welty |

OTHER PUBLICATIONS

M. Wulder et al., "Local Maximum Filtering for the Extraction of Tree Locations and Basal Area from High Spatial Resolution Imagery", Remote Sensing of Environment, vol. 73, pp. 103-114, 2000.*
J. Holmgren and A. Persson, "Identifying Species of Individual Trees Using Airborne Laser Scanner", Remote Sensing of Environment, vol. 90, pp. 415-423, 2004.*
S. Popescu and R. H. Wynne, "Seeing the Trees in the Forest: Using Lidar and Multispectral Data Fusion with Local Filtering and Variable Window Size for Estimating Tree Height", Photogrammetric Engineering & Remote Sensing, May 2004, pp. 589-604.*
Non Final Office Action in U.S. Appl. No. 12/827,933; Mailed on Dec. 19, 2012; 17 pages.

(Continued)

Primary Examiner — Kakali Chaki
Assistant Examiner — Vincent Gonzales
(74) Attorney, Agent, or Firm — Perkins Coie, LLP

(57) ABSTRACT

A method and apparatus for identifying individual trees in LiDAR data based on the view of a LiDAR data point. In one embodiment, those LiDAR data points that do not have neighboring LiDAR data points that block the local view at a defined angle are considered to be in a central part of a tree canopy. In one embodiment, those LiDAR data points that are in a central part of a tree canopy are added to an output file that stores clusters of data points for each tree canopy detected. The central part of the tree canopy area can be analyzed to predict one or more characteristics of the tree.

18 Claims, 7 Drawing Sheets

(56) References Cited

OTHER PUBLICATIONS

Andersen, H., et al., "Automated Individual Tree Measurement Through Morphological Analysis of a LIDAR-Based Canopy Surface Model," Proceedings of the First International Precision Forestry Cooperative Symposium, Seattle, Jun. 17-20, 2001, pp. 11-22.

Brandtberg, T., and F. Walter, "Automated Delineation of Individual Tree Crowns in High Spatial Resolution Aerial Images by Multiple-Scale Analysis," Machine Vision and Applications 11(2):64-73, Oct. 1998.

Carson, W.W., et al., "An Inventory of Juniper Through the Automated Interpretation of Aerial Digital Imagery," Proceedings of the First International Precision Forestry Cooperative Symposium, Seattle, Jun. 17-20, 2001, pp. 23-33.

Chen, Q., et al., "Isolating Individual Trees in a Savanna Woodland Using Small Footprint Lidar Data," Photogrammetric Engineering and Remote Sensing 72(8):923-932, Aug. 2006.

Gougeon, F.A., and D.G. Leckie, "Individual Tree Crown Image Analysis—A Step Towards Precision Forestry," Proceedings of the First International Precision Forestry Cooperative Symposium, Seattle, Jun. 17-20, 2001, pp. 43-49.

* cited by examiner

SYSTEM AND METHOD FOR ANALYZING TREES IN LIDAR DATA USING VIEWS

RELATED APPLICATIONS

The present application claims the benefit of U.S. Provisional Application No. 61/319,174 filed Mar. 30, 2010, which is herein incorporated by reference in its entirety.

BACKGROUND

Forest management often requires estimates to be made of the number of trees that are growing in a stand or other region of interest. In the past, such estimates were made by sending survey crews into the forest area to obtain sample data. From the sample data, the number of trees or other information could then be made by extrapolating the sample data to the size of the forest in question. While statistical sampling generally works well, it is often prohibitively expensive or logistically impractical to send survey crews into remote areas of the forest to obtain good sample data.

As an alternative to using human survey crews to collect the sample data, remote sensing techniques are being increasingly used to inventory forest areas. One such remote sensing technology used to survey a forest is LiDAR (light detection and ranging). With a LiDAR sensing system, a laser transmission and detection unit is carried by an aircraft over a number of overlapping flight paths that extend above a forest canopy. The LiDAR sensing system operates to transmit laser pulses in a repeating arc such that the pulses can be detected as they are reflected from the forest canopy, the ground or other natural or man made objects as the aircraft flies along. For each detected laser pulse, the LiDAR sensing system records the angle at which the pulse was received, the round trip time of flight of the pulse and the intensity of the detected pulse. The LiDAR sensing system also receives data from a GPS system and the altimeter of the aircraft so that a three-dimensional geographic location for each detected laser pulse can be determined. Data representing the three-dimensional location of each detected pulse are stored on a computer-readable medium (e.g. hard drive) in the LiDAR sensing system for later analysis with a computer.

The three-dimensional LiDAR data represents a surface map of a forest canopy. However it is often difficult to identify individual trees in the LiDAR data. As a result, a number of statistical approaches have been proposed to identify groups of LiDAR data points that represent individual trees. While such methods have met with varying degrees of success, there is a need for an improved, less computationally complex, method of identifying individual trees in LiDAR data.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

To address the above described problems and others, the technology disclosed herein relates to a programmed computer system for analyzing LiDAR data to determine if a LiDAR data point is within a central area of a tree canopy. Each LiDAR data point obtained for a region of interest is analyzed to determine if the data point has neighbors that block the local view of the data point in question for some viewing angle. If the local view of a LiDAR data point is unobstructed, then the LiDAR point is determined to represent a center area that is within a tree canopy. If the local view of the LiDAR data point is obstructed, then the LiDAR point is determined not to represent a center area that is within a tree canopy. An output file readable by a computer keeps a record of those LiDAR data points that represent areas within the tree canopies. In some embodiments, post processing is performed by a computer on the clusters of LiDAR data points in the output file to remove LiDAR data points without a sufficient number of neighbors to represent a tree or to fill in missing data points in the tree canopy.

In accordance with another aspect of the disclosed technology, the central area of the tree canopy is analyzed to determine one or more characteristics of the tree. The characteristics can include the type of tree (broadleaf or conifer), age, lumber quality etc.

In another embodiment, the disclosed technology is non-volatile computer-readable media with instructions that are executable by a computer system. The instructions, when executed, cause the computer system to analyze LiDAR data in order to identify individual trees in the LiDAR data based on the local view of LiDAR data points. Each LiDAR data point with an unobstructed local view is added to an output file that stores the location of the tree canopies.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As will be discussed in further detail below, the technology disclosed herein relates to analyzing LiDAR data to identify individual trees in a forest area. In particular, the technology relates a computer implemented process for identifying LiDAR data points that represent a central area within a tree canopy based on the "local view" of the LiDAR data points.

Figure 1:
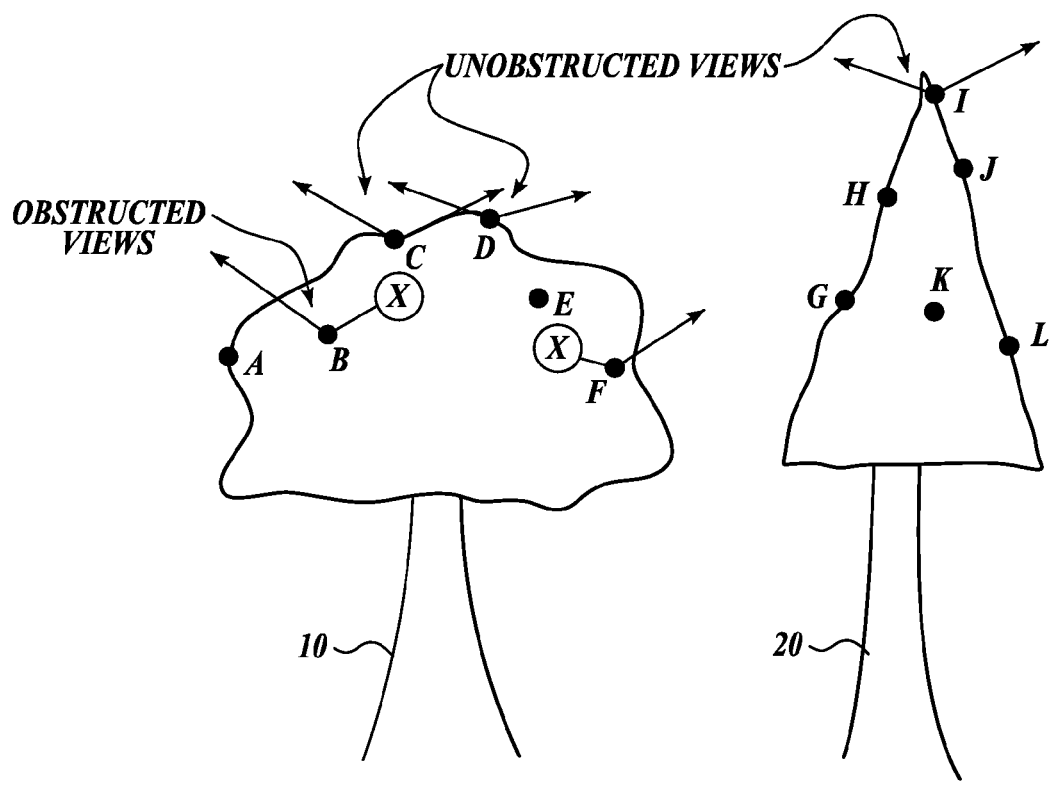
FIG. 1 illustrates a pair of trees with different canopy shapes and reflected LiDAR points.

FIG. 1 illustrates a pair of trees 10, 20 each of which is associated with a number of LiDAR data points that are created by the reflection of laser pulses from the canopy of the trees. The tree 10 is associated with the LiDAR data points A-F and the tree 20 is associated with LiDAR data points G-L. In some methods of analyzing LiDAR data, a computer is used to identify individual trees in the forest by searching the LiDAR data for data points that likely represent the tops of the trees. In the example shown, it can be easily seen that the LiDAR data point I corresponds to the top of the tree 20. By locating LiDAR data points that represent tree tops, the number of trees growing in a forest area can be easily counted.

In many trees however, the tree tops or canopies do not contain a single high point that can easily be detected as a tree top. Many trees have canopies that are more flat such as is shown for the tree 10. Because a tree may produce many LiDAR data points in the area of its canopy that are approximately the same height above ground, it can be difficult to program a computer to identify which LiDAR point corresponds to the top of the tree.

As will be explained in further detail below, the technology disclosed herein relates to a new way of identifying individual trees in LiDAR data by determining the "local view" of each LiDAR data point. The local view of a LiDAR data point determines how high the neighboring LiDAR data points are in relation to the LiDAR data point in question. If a LiDAR data point has an unobstructed local view, then it is considered to represent an area that is in a central part of a tree canopy. If the local view of a LiDAR data point is obstructed, then the LiDAR data point is not considered to represent an area that is in a central part of a tree canopy. In the example shown in FIG. 1, LiDAR data points C and D have unobstructed local views. LiDAR data point B has an unobstructed local view to the left but is blocked by LiDAR data point C to the right under some local view angle. Similarly, LiDAR data point F has an unobstructed local view to the right but is blocked by LiDAR data point E to the left under some local view angle. Therefore, for the tree 10, LiDAR data points C and D are considered as representing areas that are in a central part of the canopy and LiDAR data points B and F are not considered as representing center areas that are in the canopy. In the tree 20, LiDAR data point I has an unobstructed local view while the remainder of the LiDAR points G, H, J, K and L all have obstructed local views.

Figure 2:
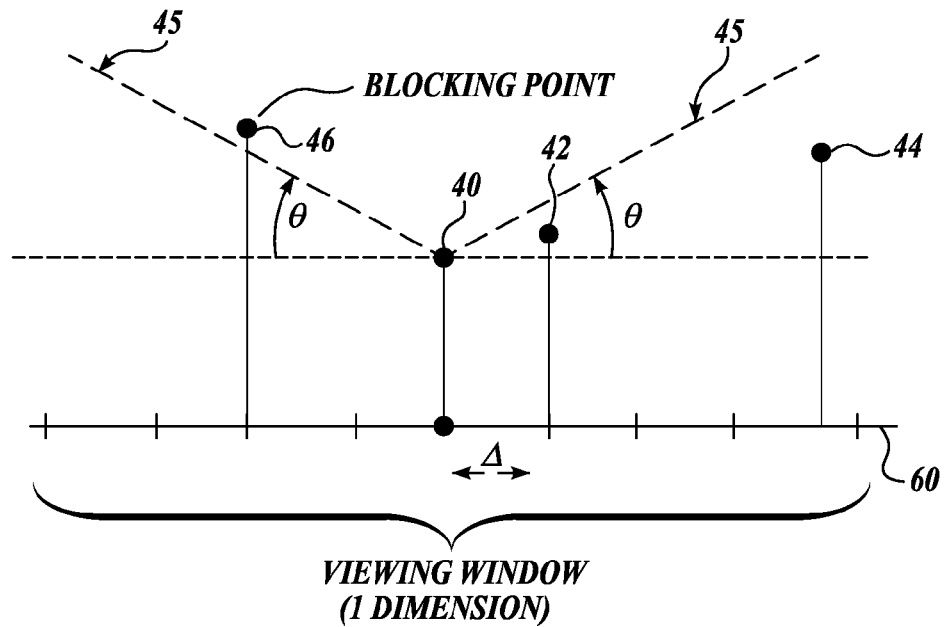
FIG. 2 illustrates one technique for determining whether a LiDAR data point represents a center area that is in a tree canopy by its local view in accordance with the disclosed technology.

FIG. 2 shows one technique for determining the local view of a LiDAR data point in accordance with the disclosed technology. A LiDAR data point 40 is checked to see if any neighboring LiDAR data points that are within a viewing window 60 have height values that are high enough such that they block the local view of the LiDAR data point 40. The size of the viewing window 60 may be related to the height value of the LiDAR data point 40 to reflect the fact that trees generally have canopy sizes that vary with the height of the tree. For example, the viewing window 60 may be a square shape with a side length that is 20% of the height of the LiDAR data point in question. If the LiDAR data point 40 has a height value that is 25 meters above ground level, then the viewing window 60 may have a size that is 10 meters on a side. In one embodiment, the viewing window 60 comprises a subset of a grid of pixels onto which the LiDAR data is mapped as will be explained in further detail below. As will be appreciated, the disclosed technology is not limited to square or rectangular viewing windows. Other shapes such as circular or oval viewing windows could also be used.

FIG. 2 illustrates one technique for determining if the local view of a LiDAR data point is "unobstructed" or "obstructed". An unobstructed local view means there are no neighboring LiDAR data points with height values that block the local view of the LiDAR data point in question for a selected viewing angle. In the example shown, LiDAR data point 40 has two neighboring LiDAR data points 42 and 44 to the right of the LiDAR data point 40 in the viewing window 60. If the height values for these data points are below an imaginary line 45 defined by a viewing angle θ then the local view of the LiDAR data point 40 in the direction of the neighboring points 42 and 44 is unobstructed.

In the example viewing window 60 shown, the distance between pixels in the grid is Δ. Therefore, if the height value for the LiDAR data point 42 is less than (height of LiDAR data point 40+Δ● tan(θ)) then the LiDAR data point 42 will not obstruct the local view of LiDAR point 40.

In the example shown in FIG. 2, it can be seen that LiDAR data points 42 and 44 do not block the local view of the LiDAR data point 40. However the LiDAR data point 46 that is located to the left of the LiDAR data point 40 does block the local view of the LIDAR data point 40. Therefore in this example, the LiDAR data point 40 is classified as having an obstructed local view and is not classified as representing a center area of a tree canopy.

As will be appreciated there are other techniques besides the trigonometric approach described herein to determine if a local view of a LiDAR data point is blocked by its neighbors. In some embodiments, the requirement that a LiDAR data point may not have any neighbors that block its local view in order to be classified as representing a center area of a tree canopy may be too strict. Therefore a LiDAR data point may be allowed to have some neighbors with heights that are slightly higher than the point in question and still be part of the center area of the canopy. Similarly, if the height value for a neighbor is only slightly higher than the imaginary line 45, then it may not prevent the point in question from being classified as representing a center area of the canopy. How strict the no blocking neighbors rule can be and still identify individual trees in the LiDAR data can be based on comparing the results of test LiDAR with data for which a ground truth survey has been completed.

For each LiDAR data point that is found to have an unobstructed local view, the LiDAR data (x, y location, height, intensity etc.) for the data point are copied into an output file that stores clusters of data points that represent the central areas of the various tree canopies in the forest. By counting the clusters (raster polygons) or groups of LiDAR data points, the number of trees in the geographic region of interest can be determined.

In accordance with another aspect of the disclosed technology, the central canopy area determined from the LiDAR data can be analyzed to estimate one or more characteristics of the tree. For example, a tree with a central canopy area that is relatively wide or large compared with the height of the tree is likely a broadleaf tree. Conversely, a tree with a relatively small central canopy area compared with the height of the tree is likely a conifer tree. Therefore, by comparing the size of the central canopy area to the height of the tree, the type of tree (broadleaf or conifer) can be estimated. Another characteristic that can be estimated is the age of the tree based on a size of its central canopy area and the height of the tree. Younger trees will be less tall with a correspondingly smaller canopy than older trees. Still another characteristic that can be estimated is the quality of lumber in the tree. It is generally known that trees with many fine branches produce better quality lumber than those with fewer large branches. A tree with fine branches will produce LiDAR reflections with a larger central canopy area than a tree with fewer larger branches. Therefore, by analyzing the size/shape of the central canopy area and the height of the tree, an estimate can be made about the quality of the lumber.

One method of estimating a characteristic of a tree from its central canopy area is based on a statistical analysis of ground truth data obtained from physically surveyed trees. A table or other look up device in the memory of the computer can then be used to store information that correlates measurements of the central canopy area with the tree characteristic to be estimated.

Figure 3:
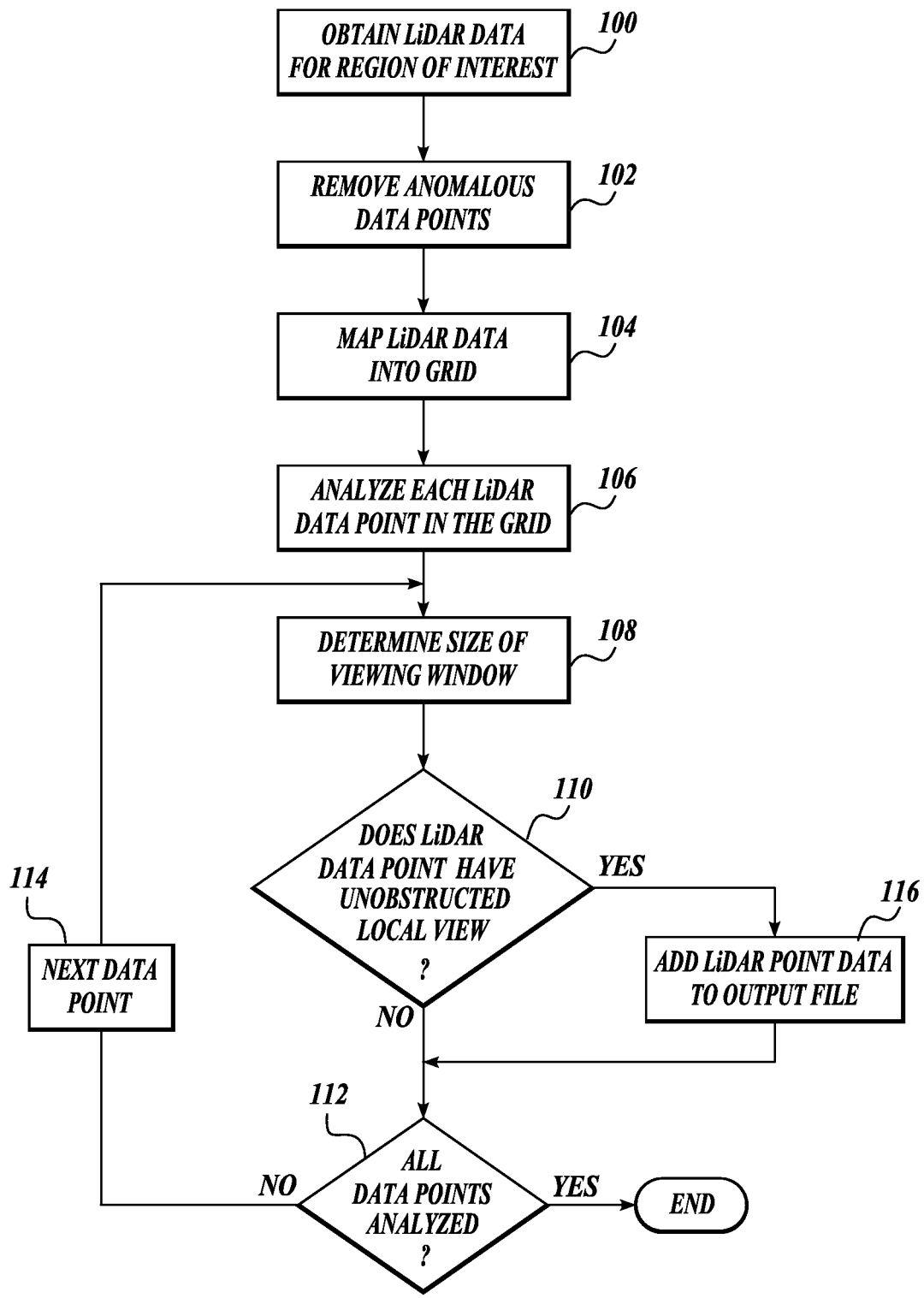
FIG. 3 is a flow chart of steps performed by a computer system to identify individual trees in LiDAR data in accordance with an embodiment of the disclosed technology.

FIG. 3 is a flowchart of steps performed by a programmed computer system in accordance with one embodiment of the disclosed technology. Although the steps are shown in a particular order for ease of explanation, it will be appreciated that the order may be changed or other steps performed to achieve the functionality described.

Beginning at 100, a computer system obtains a set of LiDAR data for a region of interest. In the event that the LiDAR data is too large to be processed at a single time, the data may be processed in smaller geographic regions i.e. individual stands, lots etc. At 102, the computer system removes any anomalous points such as LiDAR data points that may be reflections from birds or other objects that cannot possibly be trees. In some instances a service provider that obtained the LiDAR data will have previously removed any anomalous points from the LiDAR data.

At 104, the LiDAR data is mapped onto a grid of pixels. Although it is not required to analyze the LiDAR data in a grid, such a grid provides a convenient way to index the LiDAR data points In one embodiment, the grid defines a number of cells or pixels each with a size that is dependent on the point spacing in the LiDAR data. Preferably, the pixel size is smaller than the average distance between points in the LiDAR data. For example, if the LiDAR data contains on average, nine LiDAR data points per square meter, then each LiDAR data point represents an average area of 0.33×0.33 meters. Therefore, the area represented by each pixel in the grid should be 0.33×0.33 meters or less. If there are two or more LiDAR data points that map into the same pixel in the grid, then the LiDAR data point with the highest height value is used for that pixel. Any empty pixels in the grid can be filled in by interpolation or using another statistical estimation method. The LiDAR data in the grid may then be smoothed with a smoothing filter such as a 3×3 median filter.

Beginning at 106, the computer begins a processing loop that analyzes the LiDAR data points associated with each pixel on the grid. At step 108, a viewing window size is determined for a LiDAR data point in question. In one embodiment, the viewing window has a size that is a function of the height above ground of the LiDAR data point. In one embodiment, the viewing window is a square where each side of the square has a length that is selected between 10-20% of the LiDAR data point height above ground. For example, if the LiDAR data point has a height value that is 25 meters above ground elevation, then each side of the viewing window is selected to be between 2.5-5 meters long. If each pixel in the grid represents an area 0.33 meters on a side, then the viewing window is selected to be between 7 to 15 pixels long on each side. Odd numbers of pixels per side are generally preferred so that the LiDAR data point in question can be placed in the center of the viewing window.

At 110 it is determined if the LiDAR data point at the center of the viewing window has an obstructed view for a viewing angle $\theta$. In one embodiment, the determination of whether a neighbor LiDAR point is blocking the view is made according to the techniques shown in FIG. 2. As will be appreciated, at a viewing angle $\theta=0$ degrees, it is highly likely that a LiDAR data point will have at least one neighboring LiDAR data point that has a height value that is higher than the imaginary line extending out from the data point in question. Therefore at $\theta=0$ few, if any, LiDAR data points will be determined to represent an area that is in a central part of a tree canopy. Conversely, at $\theta=90$ no neighboring LiDAR data points will have a height value that will block the view of the LiDAR data point in question. Therefore at a viewing angle of 90 degrees, every LiDAR data point will be determined to represent an area that is in a central part of the tree canopy. The particular viewing angle to be used can be selected based on trial and error, received from a user or pre-set. In one embodiment, viewing angles between 15-20 degrees appear to work well for use in identifying LiDAR data points that represent an area of a tree canopy for both hardwood and conifer trees.

In one embodiment, the neighbors of a LiDAR data point are checked in 8 directions in the grid around the LiDAR data point where each direction is oriented at 45 degrees apart. However, it is possible to check every neighboring LiDAR data point in the view window. For example, a computer can test all the LiDAR data points that are within the viewing window to determine if they have a height value that will block the view of the LiDAR data point in question.

If the answer to step 110 is no, then it is determined if all the LiDAR data points in the grid have been analyzed. If not, processing proceeds to step 114 and the next point in the grid is analyzed in the manner described.

If the answer to step 110 is yes, and a LiDAR data point is not blocked by any neighbors in the viewing window, then processing proceeds to step 116 where the LiDAR data for the point in question is copied to an output file that stores clusters of LiDAR data for the central part of tree canopies. In one embodiment, the output file defines a grid with the same size/number of pixels as the input file. The LiDAR data for each pixel in the input file that has an unobstructed local view is copied to a corresponding pixel in the output file. In one embodiment, a cluster of points or pixels representing central part of a tree canopy in the output file should be continuous without any holes or gaps. Therefore, once all the LiDAR data points have been analyzed, the computer may perform some post-processing on the output file. In one embodiment, the post processing analyzes each group of pixels in the output file that have LiDAR data to determine if their density is greater than a predetermined amount. If not, the data is removed from the output file. For example a post-processing search area (like a search window) can be defined having a size that is dependent on the height value of the LiDAR point in question. If there are fewer than some threshold percentage of pixels in the search area that have LiDAR data, then it is assumed that a pixel was noise or some other anomaly and its LiDAR data is removed from the output data file. A cluster with a hole or a pixel that is missing LiDAR data in the output file can be filled with interpolation or some other statistical approximation technique. By counting the continuous groups of pixels that have LiDAR data in the output file, the number of trees in the region of interest can be determined, and some other characteristics related to the canopy shape can be predicted as well. The canopy shape can be indicated as a ratio of visible canopy center area to the canopy height: A tall tree with small visible central part of the canopy indicates a conifer tree while a short tree with large visible central part of the canopy indicates a broadleaf tree.

Figure 4:
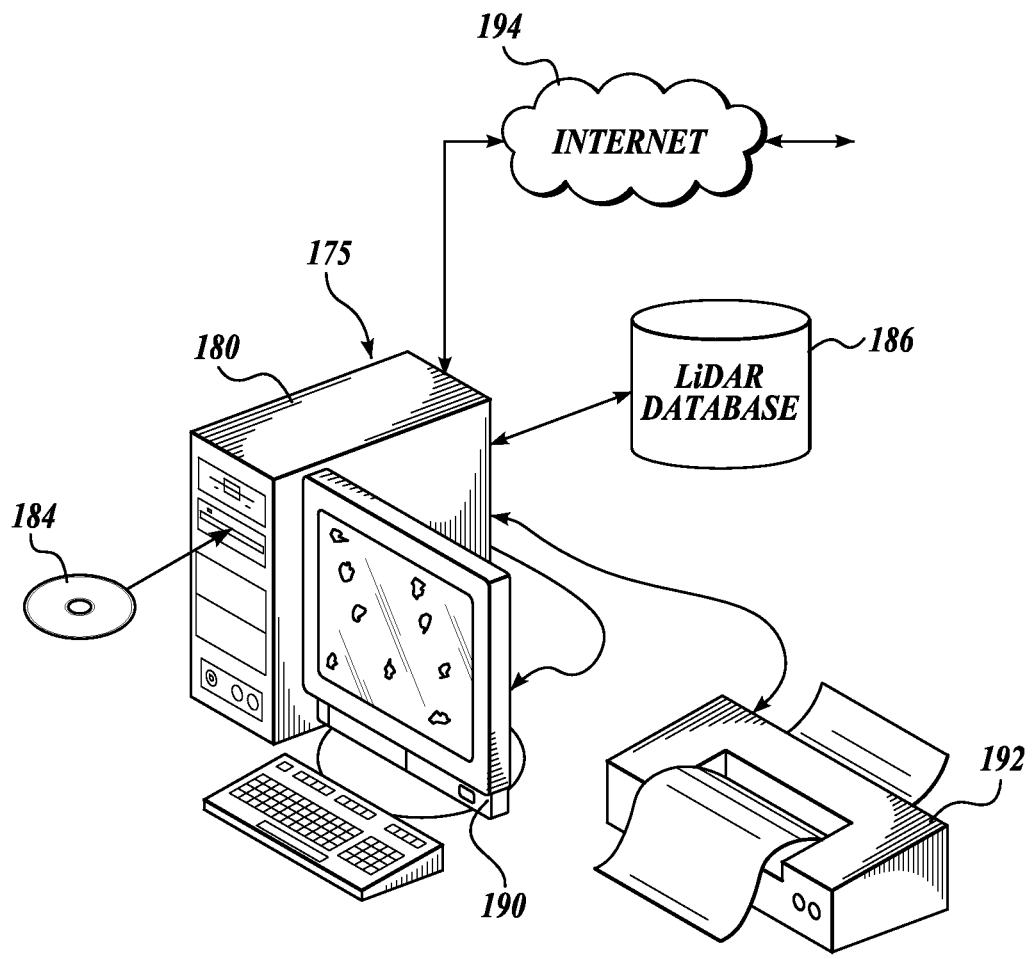
FIG. 4 is a block diagram of a representative computer system that can be used to identify individual trees in LiDAR data in accordance with the disclosed technology.

FIG. 4 shows a representative computer system that can be used to implement the techniques described above. The computer system 175 includes a processing unit 180 with one or more programmed processors that are configured to execute a sequence of instructions that are stored on non-volatile, non-transitory, computer-readable media 184 such as hard drive, CD-ROM, flash drive etc. The processing unit stores the executable instructions in a memory and executes the instructions to read LiDAR data that are stored in a database 186. The instructions, when executed, cause the one or more processors to transform the raw LiDAR data into data representing individual trees in a region of interest. The processors analyze the LiDAR data in order to identify individual trees according to the techniques described above. The results of the analysis (e.g. the number and location of trees identified and their canopies or other characteristics of the trees) may be stored in memory, displayed as an image on a monitor 190, printed as a map on a printer 192, or transmitted to a remote location/computer system using a wired or wireless communication link 194.

Another use of a measurement related to the view of a LiDAR data point is to help refine the number of trees that are estimated to be represented by a cluster of LiDAR data points. When processing LiDAR data to estimate the number of trees in a region, LiDAR data points that may represent a tree are grouped together in a cluster, which is sometimes referred to as a "blob" of LiDAR data points. In one embodiment of the disclosed technology, clusters or blobs of LiDAR data points are identified according to the method set forth in U.S. Pat. No. 7,474,964, which is herein incorporated by reference. In the techniques described in the '964 patent, LiDAR data points for a geographic region are sorted from highest to lowest. Beginning at the highest LiDAR data point, each adjacent LiDAR data point is analyzed to determine if it is within a previously defined digital crown or branch umbrella area. If so, the LiDAR data point is added to the blob. If not, the LiDAR data point may define a new blob. In another embodiment, the clusters or blobs can be calculated using other methods such as the local view method described above. Regardless of the method used to define the clusters or blobs, the number of trees in an area can be estimated by counting up the number of blobs created from the LiDAR data.

In some cases, a blob of LiDAR data points may represent more than one tree. Therefore, using the number of blobs to estimate the number of trees in an area may result in an under estimate of the number of trees. In other cases, a blob may represent a shrub, i.e. zero trees, such that counting the blob as a tree will result in an over estimate of the number of trees.

Figure 5:
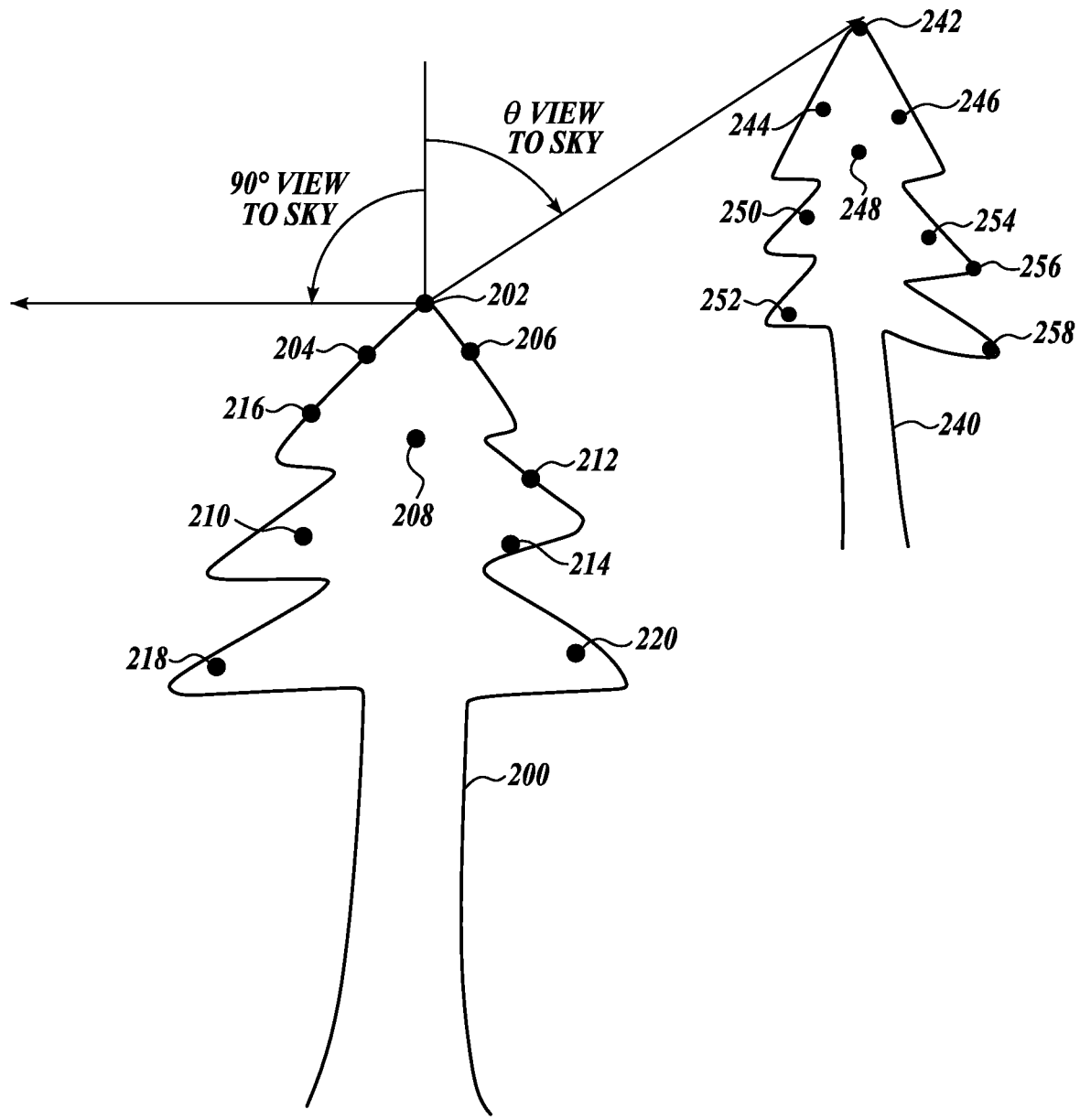
FIG. 5 illustrates a tree represented by a LiDAR point cluster or blob and the view-to-sky angle determined from the highest LiDAR data point in the blob to a neighboring blob.
Figure 6:
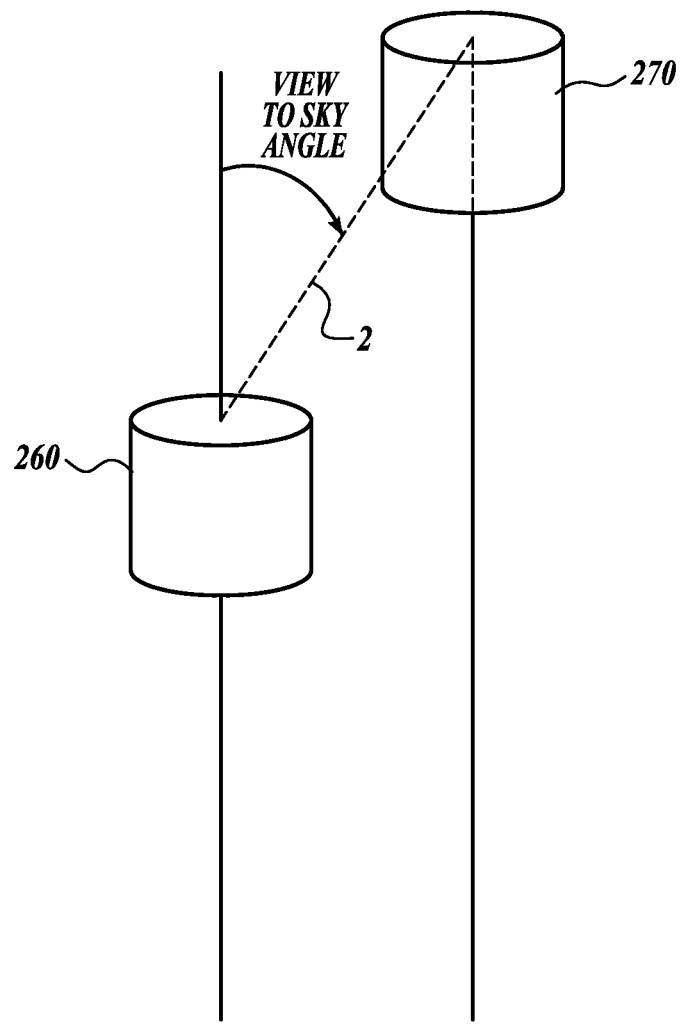
FIG. 6 illustrates one technique for computing a view-to-sky angle in accordance with an embodiment of the disclosed technology.

To improve the estimate of the number of trees that are represented by a single blob or cluster of LiDAR data points, the number of trees represented by a blob is adjusted based on the amount of exposure a LiDAR data point has to the sky. In one embodiment, the amount of exposure is quantified by a view-to-sky angle. One embodiment of the disclosed technology calculates the average view-to-sky angle for a LiDAR data point that defines the highest point in the blob. FIG. 5 illustrates a tree 200 that is represented by a blob of LiDAR data points 202-220. A nearby tree 240 is represented by a second blob of LiDAR data points 242-258. Unlike the techniques described above where LiDAR data points are analyzed to determine if a neighboring blob has a height that is above a line defined by a predetermined local view angle, the value for the view-to-sky angle for a data point in a blob (referred to as the target blob) is calculated.

In one embodiment, the view-to-sky angle for a LiDAR data point 202 is defined as a maximum angle between 0 and 90 degrees (measured from vertical) at which a radial line drawn outwards from the LiDAR data point in question extends to clear the top of a neighboring blob within a pre-defined radius. The view-to-sky angle therefore quantifies the amount of exposure of the LiDAR data point to the sky. If the tree 200 shown in FIG. 5 has no neighboring trees (e.g. the tree 200 is standing in an open field), then the view-to-sky angle for each radial line would be 90 degrees. If a blob that represents a neighboring tree were very close to the tree 200, then the view-to-sky angle for at least some of the radial lines extending from LiDAR data point 202 would be closer to 0 degrees. In one embodiment, the view-to-sky angle calculated for a radial line is normalized between 0 and 1 by dividing the angle in degrees by 90 or in radians by pi/2.

To calculate the average view-to-sky angle for a LiDAR data point in a blob, each blob is represented as a cylinder. As will be appreciated by those skilled in the art, LiDAR data point blobs may be represented in a computer-readable file or database as a list of LiDAR data points that define a polygon around the blob. To speed processing, one embodiment of the technology represents each blob as a cylinder with a cross-sectional area equal to the area of the corresponding polygon and a height equal to the highest point in the blob. If processing time is not an issue, then processing can be performed on the LiDAR data points that define the blob polygons themselves.

In one embodiment, a computer system, such as shown in FIG. 4, executes a sequence of program instructions stored on a computer-readable medium to analyze the list of blobs to determine if each target blob has any neighboring blobs within a defined radius (e.g., 10 meters). If so, the computer first defines a line that extends from the target blob center (typically the highest point in the blob) to the center of the neighboring blob(s). Then the computer defines a line through the diameter of the neighboring blobs in a direction perpendicular to the line connecting the target and neighboring blob's centers.

Figure 7:
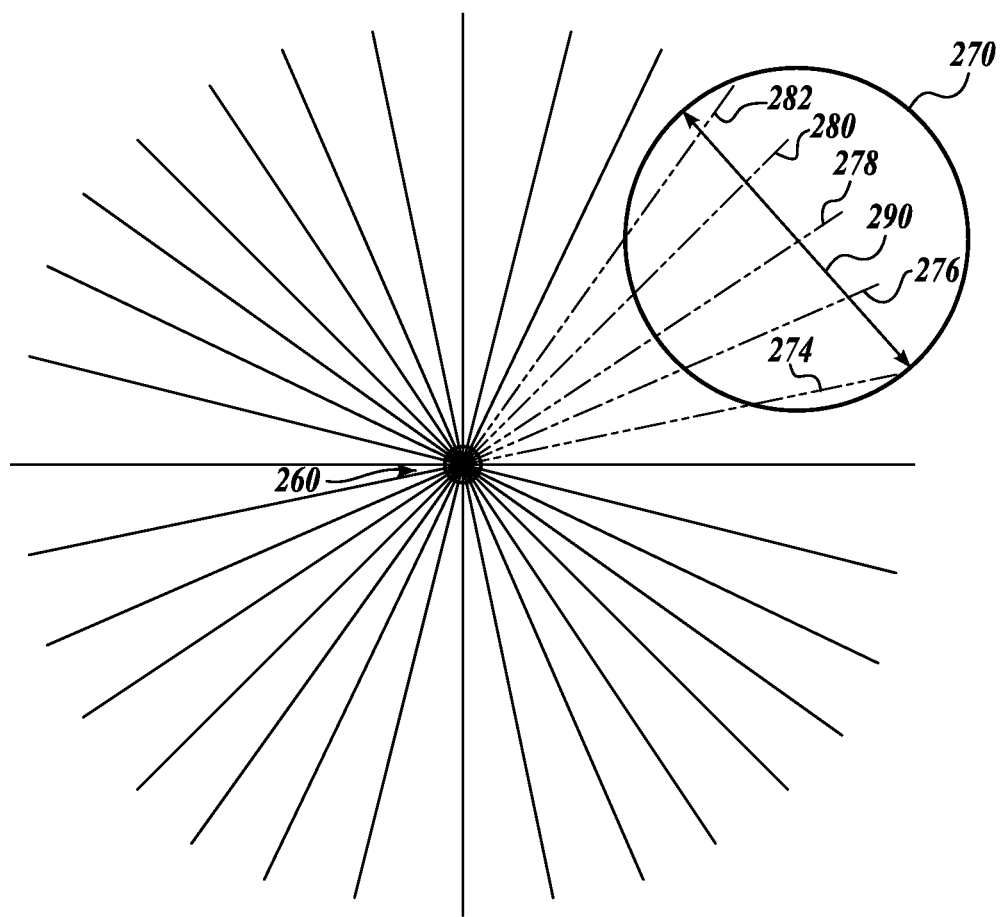
FIG. 7 illustrates a technique for calculating multiple view-to-sky angles from a LiDAR data point in accordance with an embodiment of the disclosed technology.

Next, the computer is programmed to determine if any number of radial lines that extend outwards from the LiDAR point in the target blob intersect the line defining the diameter of the neighboring blob. As shown in FIG. 7, a number of radial lines 274-282 extend outward from the target blob 260 and intersect a line 290 that is defined along the diameter of the neighboring blob 270.

In the example shown in FIG. 7, only the radial lines 274-282 intersect the neighboring blob. The remaining radial lines do not intersect a neighboring blob, so they all have a view-to-sky angle of "1". The radial lines 274-282 can be thought of as being pushed up like spokes on bicycle wheel or rolling over top of the adjacent tree by an amount depending on the height of the LiDAR points in the neighboring blob. In the example shown, all the points along the diameter of the neighboring blob are assumed to have a height value equal to the maximum height of the neighboring blob 270. However, it will be appreciated that the heights of the nearest LiDAR data point to the diagonal line 290 or the heights of other LiDAR data points in the neighboring blob could also be used. However this would likely require more processing time.

The view-to-sky angle for each radial line can be trigonometrically determined from the height difference between the height of the neighboring blob 270 and the height of the target blob 260 and the distance between the blobs. The average view-to-sky angle for the LiDAR data point in the target blob is therefore the sum of the view-to-sky angles calculated for each radial line divided by the number of radial lines used (and normalized by dividing the sum by 90 degrees or pi/2).

In one embodiment, if there are two or more neighboring blobs that are intersected by a single radial line from the target blob, then the view-to-sky angle is determined by the highest (as measured from horizontal) view-to-sky angle created by any blob encountered on the radial line. This has the effect of minimizing the influence of multiple trees on one side of a target blob.

Once the average view-to-sky angle has been computed for a LiDAR data point that defines the highest point in the target blob, the average view-to-sky angle is used to estimate the number of trees represented by the target blob. As indicated above, some blobs may not represent any trees. For example, a shrub surrounded by trees in a forest will likely have a low average view-to-sky angle. Therefore if a blob has a low average view-to-sky angle, then a decision can be made by a computer indicating that a blob may represent zero trees. The number of trees represented by a blob does not have to be a whole number. For statistical purposes the computer may assign fractional trees (e.g. 1.5, 1.7123, 2.25 etc.) to a blob depending on the average view-to-sky angle.

Figure 8:
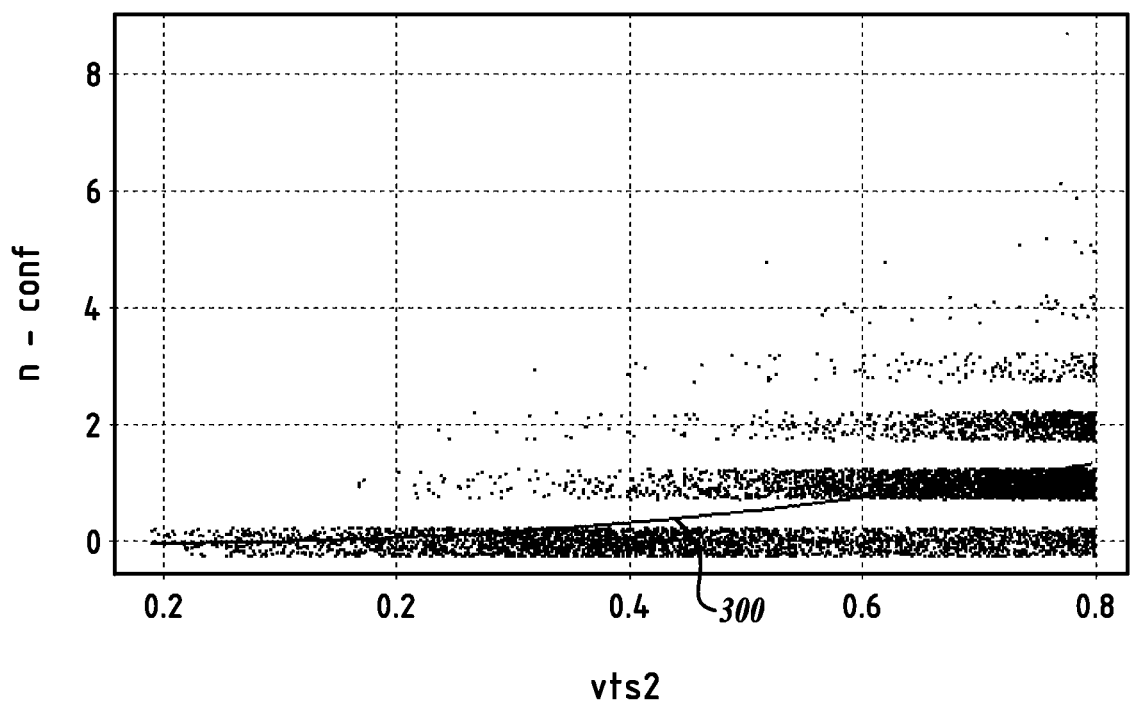
FIG. 8 illustrates a representative scatter plot showing a relationship between the number of trees represented by a blob and the average view-to-sky angle determined for a LiDAR data point in the blob.

FIG. 8 is an exemplary scatter plot showing the relationship between the number of conifers represented by a blob as confirmed by ground truth data versus the average view-to-sky angles (normalized between 0 and 1) computed for the blobs. A best fit curve 300 can be drawn though the data and used to estimate actual number of trees represented by a blob. In the example shown, it can be seen that when the average view-to-sky angle is about 0.7 or greater (i.e. greater than about 63 degrees) then it is more likely that there are one or more trees in the blob. From the best fit line 300, the fractional number of trees is determined for a particular blob given its average view-to-sky angle. The particular curve used may depend on the area of the country from which the LiDAR is obtained, the predominant species of the trees, whether the forest is managed or unmanaged or a number of other factors.

As will be appreciated from the above, the number of trees represented by a blob of LiDAR data can be better estimated by analyzing how open the view is from a LiDAR data point at the top of the blob. Although the disclosed embodiments compute the average view-to-sky angle for the highest LiDAR data point in a blob, it will be appreciated that the technique can be used for other LiDAR data points. For example, some large branches in a tree can get categorized as separate clusters or blobs. By determining the average view-to-sky angle for one or more LiDAR data points in such a separate cluster or blob, the computer can be programmed to force such a blob to merge with an adjacent blob that most likely represents the main part of the same tree.

While illustrative embodiments have been illustrated and described, it will be appreciated that various changes can be made therein without departing from the scope of the invention. For example, it is not required that the LiDAR data points be processed in a grid. Each of the LiDAR data points could be analyzed by searching outwards a predetermined distance for neighbors that block the local view of a data point and by analyzing those points in a defined radius to determine if they represent an area in the central part of the tree canopy. It is therefore intended that the scope of the invention be determined from the following claims and equivalents thereof.

The embodiments of the invention in which an exclusive property or privilege is claimed are defined as follows:

1. A computer system for identifying individual trees in Light Detection and Ranging (LiDAR) data, comprising:
a memory that stores a sequence of programmed instructions that are executable by a processor; and
a processor that is configured to execute the instructions to identify individual trees in a set of LiDAR data by:
for each LiDAR data point in the set of LiDAR data:
determining if the LiDAR data point has one or more neighboring LiDAR data points with a height value that is above a height defined by an angle from the LiDAR data point;
determining whether to add the LIDAR data point to a cluster based on a number of neighboring LIDAR data points that have heights above the height defined by the angle; and
classifying the cluster of LiDAR data points as representing a central area of a tree canopy.

2. The system of claim 1, wherein the instructions cause the processor to determine a viewing window for the LiDAR data point and to determine if the LiDAR data point has one or more neighboring LiDAR data points with a height value that is above the height defined by the angle in an area of the viewing window.

3. The system of claim 2, wherein the viewing window has a size that is a function of a height value of the LiDAR data point being analyzed.

4. The system of claim 1, wherein the instructions cause the processor to analyze the clusters of LiDAR data to remove LiDAR data that lacks sufficient neighbors to represent a tree.

5. The system of claim 1, wherein the instructions cause the processor to analyze the LiDAR data to add LiDAR data to fill in gaps in a cluster of LiDAR data that represents a central area of a tree canopy.

6. The system of claim 1, wherein the instructions cause the processor to estimate a characteristic of a tree based on the LiDAR data in a cluster that are classified as representing a central area in the canopy of a tree.

7. The system of claim 6, wherein the characteristic of the tree is whether the tree is a broadleaf tree or a conifer.

8. The system of claim 6, wherein the characteristic is a quality of the lumber in a tree.

9. A non-transitory computer-readable medium containing instructions that are executable by a processor to identify individual trees in a set of Light Detection and Ranging (LiDAR) data by:
analyzing each LiDAR data point in the set of LiDAR data to determine if the LiDAR data point has one or more neighboring LiDAR data points with a height value that is above a height defined by an angle from the LiDAR data point;
adding the LiDAR data point to a cluster depending on the number of neighboring LiDAR data points with heights above the height defined by the angle; and
classifying the cluster of LiDAR data points as representing a central area of a tree canopy.

10. The non-transitory computer-readable medium of claim 9, wherein the instructions are executable by the processor to determine a viewing window for the LiDAR data point and wherein the instructions are executable by the processor to determine if the LiDAR data point has one or more neighboring LiDAR data points with a height value that is above the height determined by the angle in an area of the viewing window.

11. The non-transitory computer-readable medium of claim 10, wherein the instructions are executable by the processor to determine a size for the viewing window as a function of a height value of the LiDAR data point being analyzed.

12. The non-transitory computer-readable medium of claim 9, wherein the instructions are executable to cause the processor to add LiDAR data to an output file for each LiDAR data point that is classified as representing a central area of a tree canopy.

13. The non-transitory computer-readable medium of claim 12, wherein the instructions are executable to cause the processor to analyze the LiDAR data in the output file to remove LiDAR data that lack sufficient neighbors to represent a tree.

14. The non-transitory computer-readable medium of claim 12, wherein the instructions are executable to cause the processor to analyze the LiDAR data in the output file to add LiDAR data to fill in gaps in the LiDAR data that represent a central area of a tree canopy.

15. The non-transitory computer-readable medium of claim 9, wherein the instructions cause the processor to identify a characteristic of a tree based on the LiDAR data that are classified as representing a central area in the canopy of a tree.

16. The non-transitory computer-readable medium of claim 15, wherein the characteristic of the tree is whether the tree is a broadleaf tree or a conifer.

17. The non-transitory computer-readable medium of claim 15, wherein the characteristic is an age of the tree.

18. The non-transitory computer-readable medium of claim 15, wherein the characteristic is a quality of the lumber of the tree.

* * * * *